(12) United States Patent
Hayashi et al.

(10) Patent No.: US 10,439,198 B2
(45) Date of Patent: Oct. 8, 2019

(54) SOLUTION FOR FORMING LAYER THAT CONTAINS SOLID ELECTROLYTE FOR ALL-SOLID-STATE ALKALI METAL SECONDARY BATTERIES, COATED ACTIVE MATERIAL PARTICLES, ELECTRODE, ALL-SOLID-STATE ALKALI METAL SECONDARY BATTERY AND METHOD FOR MANUFACTURING SAME

(71) Applicant: JAPAN SCIENCE AND TECHNOLOGY AGENCY, Kawaguchi-shi, Saitama (JP)

(72) Inventors: Akitoshi Hayashi, Sakai (JP); Masahiro Tatsumisago, Sakai (JP); Kiyoharu Tadanaga, Sapporo (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 514 days.

(21) Appl. No.: 15/026,817

(22) PCT Filed: Sep. 30, 2014

(86) PCT No.: PCT/JP2014/076126
§ 371 (c)(1),
(2) Date: Apr. 1, 2016

(87) PCT Pub. No.: WO2015/050131
PCT Pub. Date: Apr. 9, 2015

(65) Prior Publication Data
US 2016/0240838 A1    Aug. 18, 2016

(30) Foreign Application Priority Data
Oct. 3, 2013    (JP) .................................. 2013-208247

(51) Int. Cl.
*H01M 10/0562*    (2010.01)
*H01M 4/04*    (2006.01)
(Continued)

(52) U.S. Cl.
CPC ....... *H01M 4/0407* (2013.01); *H01M 10/052* (2013.01); *H01M 10/054* (2013.01);
(Continued)

(58) Field of Classification Search
CPC .................. H01M 10/0525; H01M 10/0562
See application file for complete search history.

(56) References Cited

U.S. PATENT DOCUMENTS

| | | | | |
|---|---|---|---|---|
| 2013/0164631 | A1* | 6/2013 | Ohtomo | H01M 10/0525 429/319 |
| 2014/0004257 | A1* | 1/2014 | Kubo | H01M 4/0404 427/126.1 |

(Continued)

FOREIGN PATENT DOCUMENTS

| | | |
|---|---|---|
| JP | 2011-136899 A | 7/2011 |
| JP | 2012-199003 A | 10/2012 |

(Continued)

OTHER PUBLICATIONS

Sakuda, A., et al. LiCoO2 Electrode Particles Coated with Li2S—P2S5 Solid Electrolyte for All-Solid-State Batteries, Electrochemical and Solid-State Letters, 13 (6) A73-A75, 2010.

(Continued)

*Primary Examiner* — Olatunji A Godo
(74) *Attorney, Agent, or Firm* — Stites & Harbison, PLLC; Terry L. Wright; Jeffrey A. Haeberlin

(57) ABSTRACT

A forming solution for forming a layer containing a solid electrolyte for an all-solid-state alkali metal secondary battery comprising a component derived from $A_2S$ and $M_xS_y$ (A is selected from Li and Na; M is selected from P, Si, Ge, B, (Continued)

Al and Ga; and x and y are a number that gives a stoichiometric ratio in accordance with a species of M) as a starting material for manufacturing the solid electrolyte, a nonpolar organic solvent and a polar organic solvent having a polarity value higher than that of the nonpolar organic solvent by 0.3 or more.

22 Claims, 12 Drawing Sheets

(51) Int. Cl.
  *H01M 10/052* (2010.01)
  *H01M 10/058* (2010.01)
  *H01M 10/0525* (2010.01)
  *H01M 10/054* (2010.01)
  *H01M 4/13* (2010.01)
  *H01M 4/139* (2010.01)
  *H01M 4/36* (2006.01)
  *H01M 4/62* (2006.01)

(52) U.S. Cl.
  CPC ..... *H01M 10/058* (2013.01); *H01M 10/0525* (2013.01); *H01M 10/0562* (2013.01); *H01M 4/13* (2013.01); *H01M 4/139* (2013.01); *H01M 4/366* (2013.01); *H01M 4/62* (2013.01); *H01M 2300/0068* (2013.01); *Y02T 10/7011* (2013.01)

(56) References Cited

U.S. PATENT DOCUMENTS

| | | | |
|---|---|---|---|
| 2014/0087270 A1* | 3/2014 | Yoshida | H01M 4/485 429/304 |
| 2014/0154585 A1* | 6/2014 | Hayashi | H01M 4/5815 429/319 |
| 2014/0287324 A1* | 9/2014 | Tsuchida | H01M 4/366 429/304 |
| 2015/0024280 A1 | 1/2015 | Uchiyama | |

FOREIGN PATENT DOCUMENTS

| | | | |
|---|---|---|---|
| JP | 2012-212652 A | | 11/2012 |
| JP | 2013-037950 A | | 2/2013 |
| WO | WO2012026238 | * | 3/2012 |
| WO | WO2012128374 | * | 9/2012 |
| WO | 2012/160707 A1 | | 11/2012 |
| WO | WO2012160698 | * | 11/2012 |
| WO | WO2013015321 | * | 1/2013 |
| WO | WO2013073038 | * | 5/2013 |

OTHER PUBLICATIONS

Sakuda, A., et al. All-solid-state lithium secondary batteries using LiCoO2 particles with pulsed laser deposition coatings of Li2S—P2S5 solid electrolytes, Journal of Power Sources 196, 6735-6741, 2011.

Japan Patent Office, International Search Report in international stage of subject application, dated Jan. 13, 2015.

* cited by examiner

SOLUTION FOR FORMING LAYER THAT CONTAINS SOLID ELECTROLYTE FOR ALL-SOLID-STATE ALKALI METAL SECONDARY BATTERIES, COATED ACTIVE MATERIAL PARTICLES, ELECTRODE, ALL-SOLID-STATE ALKALI METAL SECONDARY BATTERY AND METHOD FOR MANUFACTURING SAME

TECHNICAL FIELD

The present invention relates to a solution (forming solution) for forming a layer containing a solid electrolyte for an all-solid-state alkali metal secondary battery, a coated active material particles, an electrode, an all-solid-state alkali metal secondary battery and a method for manufacturing the same. More particularly, the present invention relates to the forming solution for making it possible to form one of a solid electrolyte layer, a positive electrode and a negative electrode constituting the all-solid-state alkali metal secondary battery by an application method, the coated active material particles, the electrode, the all-solid-state alkali metal secondary battery and the method for manufacturing the same.

BACKGROUND ART

Lithium secondary batteries have high voltage and high capacity, and thus have been widely used as power supplies of mobile phones, digital cameras, camcorders, notebook computers, electric vehicles and the like. A lithium secondary battery generally distributed contains an electrolyte which is a liquid electrolyte containing an electrolyte salt dissolved in a non-aqueous solvent. As non-aqueous solvents include a number of flammable solvents, there is a need for assuring safety.

For the purpose of assuring safety, an all-solid-state lithium secondary battery has been proposed that contains a so-called solid electrolyte formed from solid materials devoid of the non-aqueous solvent. This all-solid-state lithium secondary battery has a construction provided with a positive electrode, a negative electrode and the solid electrolyte layer positioned between the positive electrode and the negative electrode. The solid electrolyte layer is constituted of a solid electrolyte. Also, the positive electrode and the negative electrode contain a positive electrode active material and a negative electrode active material, respectively, and typically, further contain a solid electrolyte for improving electric conductivity.

A method is known in which the solid electrolyte layer, the positive electrode and the negative electrode are formed to be integrated by pressing starting materials. However, according to this method, the adhesion between the source materials is low, so that it has been difficult to obtain a sufficient electric conductivity.

Thus, a method is proposed in which the positive electrode active material is coated with the solid electrolyte by using a pulse laser deposition technique (Electrochemical and Solid-State Letters, 13(6)A73-A75(2010): Non-Patent document 1, Journal of Power Sources 196(2011)6735-6741: Non-Patent document 2). According to this method, it is assumed that the adhesion between the positive electrode active material and the solid electrolyte becomes high and, for this reason, the electric conductivity can be enhanced.

PRIOR ART DOCUMENTS

Non-Patent Documents

Non-Patent Document 1: Electrochemical and Solid-State Letters, 13(6)A73-A75(2010)
Non-Patent Document 2: Journal of Power Sources 196 (2011)6735-6741

SUMMARY OF THE INVENTION

Problems to be Solved by the Invention

In a vapor-phase deposition method such as the pulse laser deposition technique, an apparatus used has a large scale; a cost of film forming is high; and moreover it is difficult to manufacture continuously, so that it has been desired to form a layer containing the solid electrolyte by simple procedures.

Solutions to the Problems

As a result of studies on a method of forming a layer containing a solid electrolyte by simple procedures, the inventors of the present invention have found out that the layer containing the solid electrolyte can be formed continuously and at a low cost with use of a simple manufacturing apparatus by an application method using a solution containing a component derived from a source material of the solid electrolyte obtained by using a nonpolar organic solvent and a polar organic solvent, thereby achieving the present invention.

Thus, the present invention provides a forming solution for forming a layer containing a solid electrolyte for an all-solid-state alkali metal secondary battery comprising a component derived from $A_2S$ and $M_xS_y$ (A is selected from Li and Na; M is selected from P, Si, Ge, B, Al and Ga; and x and y are a number that gives a stoichiometric ratio in accordance with a species of M) as a source material for manufacturing the solid electrolyte, a nonpolar organic solvent and a polar organic solvent having a polarity value higher than that of the nonpolar organic solvent by 0.3 or more.

Also, the present invention provides an all-solid-state alkali metal secondary battery comprising a positive electrode, a negative electrode and a solid electrolyte layer positioned between the positive electrode and the negative electrode, wherein one of the solid electrolyte layer, the positive electrode and the negative electrode is formed by application of the forming solution and drying.

The present invention further provides a method for manufacturing an all-solid-state alkali metal secondary battery comprising a positive electrode, a negative electrode and a solid electrolyte layer positioned between the positive electrode and the negative electrode, wherein one of the solid electrolyte layer, the positive electrode and the negative electrode is formed by application of the forming solution and drying.

The present invention also provides a coated active material particle for a positive electrode and/or a negative electrode of an all-solid-state alkali metal secondary battery, wherein the coated active material particle includes an active material particle and a layer containing a solid electrolyte that coats a surface along an outer shape thereof; and the solid electrolyte contains $A_2S$ and $M_xS_y$ (A is selected from Li and Na; M is selected from P, Si, Ge, B, Al and Ga; and x and y are a number that gives a stoichiometric ratio in accordance with a species of M).

The present invention further provides an electrode for an all-solid-state alkali metal secondary battery comprising an assembly of a plurality of active material particles and a layer containing a solid electrolyte that coats a surface along an outer shape of individual active material particles and fills a gap between the active material particles, wherein the solid electrolyte contains $A_2S$ and $M_xS_y$ (A is selected from Li and Na; M is selected from P, Si, Ge, B, Al and Ga; and x and y are a number that gives a stoichiometric ratio in accordance with a species of M); and the electrode is a positive electrode and/or a negative electrode.

Effects of the Invention

According to the present invention, there can be provided a forming solution for forming a layer containing a solid electrolyte for an all-solid-state alkali metal secondary battery that can form a layer containing the solid electrolyte by simple procedures.

Also, there can be provided a forming solution for forming the layer containing the solid electrolyte for the all-solid-state alkali metal secondary battery that can form the layer containing the solid electrolyte by simpler procedures when the solution has any one of the following features:

(1) the forming solution is a solution obtained by adding a source material into a nonpolar organic solvent to obtain a mixed liquid and subsequently adding a polar organic solvent into the mixed liquid;
(2) the nonpolar organic solvent has a polarity value of less than 0.5, and the polar organic solvent has a polarity value of 0.5 or more;
(3) the nonpolar organic solvent is selected from hydrocarbons having a carbon number of 5 to 10, and the polar organic solvent is selected from aliphatic alcohols having a carbon number of 1 to 4, formamide, formamide substituted with an alkyl group having a carbon number of 1 to 4, and hydrazine-based compounds;
(4) the nonpolar organic solvent is n-hexane, and the polar organic solvent is N-methylformamide or ethylenediamine; and
(5) the solid electrolyte is $Li_2S$— or $Na_2S$-$M_xS_y$ containing $Li_2S$-or-$Na_2S$ and $M_xS_y$ at a ratio of 50:50 to 90:10 (molar ratio), and $M_xS_y$ is $P_2S_5$.

Further, according to the present invention, there can be provided coated active material particles whose surface is almost entirely coated with the layer containing the solid electrolyte, and an electrode constituted of this coated active material particle. The obtained electrode has an improved electric conductivity due to high adhesion between the active material and the layer containing the solid electrolyte exhibiting a high electric conductivity.

Also, when the layer containing the solid electrolyte that fills the gap between the active materials has a thickness of 10 to 1000 nm, an electrode having a further more improved electric conductivity can be provided.

Figure 1:
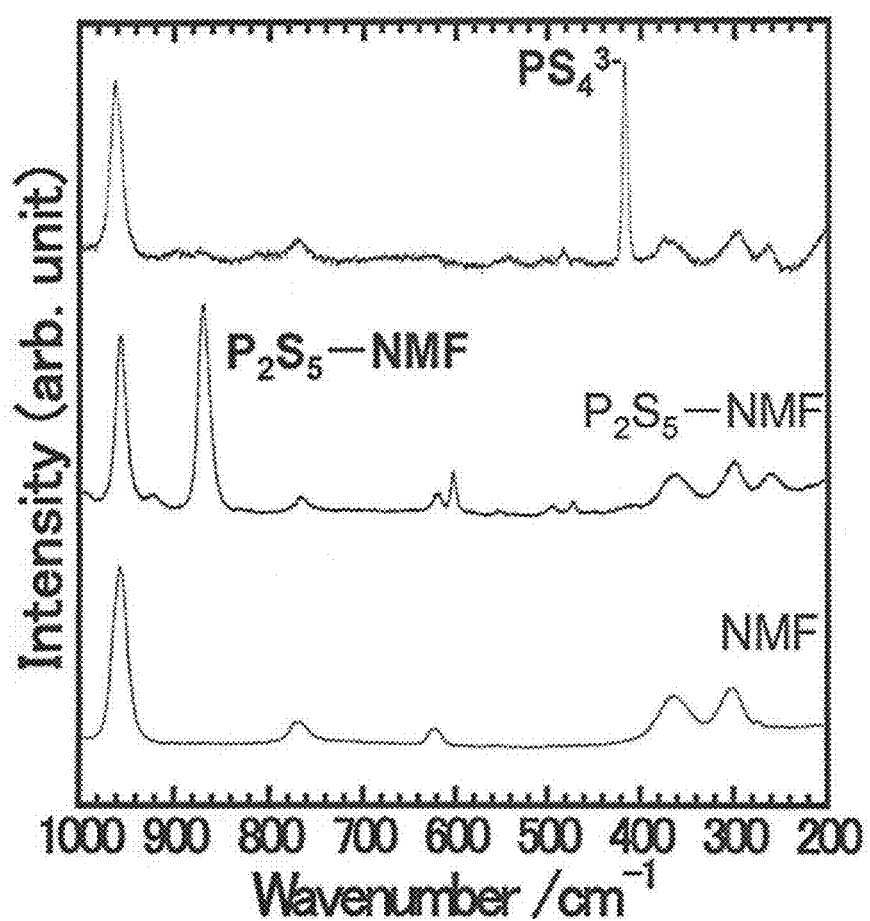
FIG. 1 is Raman spectra of an NMF solution of Example 1.

EMBODIMENTS OP THE INVENTION (Forming Solution for Forming a Layer Containing Solid Electrolyte for all-Solid-State Alkali Metal Secondary Battery)

A forming solution of the present invention can be used for forming any layers which contain a solid electrolyte constituting an all-solid-state alkali metal secondary battery. For example, a positive electrode containing a positive electrode active material and a solid electrolyte, a negative electrode containing a negative electrode active material and a solid electrolyte, and a solid electrolyte layer containing a solid electrolyte can be mentioned. An alkali metal indicates Li or Na.

The forming solution contains a component derived from $A_2S$ ($Li_2S$ or $Na_2S$) and $M_xS_y$ as starting materials for manufacturing the solid electrolyte, a nonpolar organic solvent and a polar organic solvent.

(1) Starting materials of solid electrolyte

The starting materials contain at least $Li_2S$ or $Na_2S$ and $M_xS_y$.

(i) $M_xS_y$

In the $M_xS_y$ which is a sulfide, M is selected from P, Si, Ge, B, Al and Ga, and x and y are numbers that gives a stoichiometric ratio in accordance with a species of M. Six elements that can be used as M can have various valence numbers, and x and y can be set in accordance with the valence number thereof. For example, P can be trivalent or pentavalent; Si can be tetravalent; Ge can be divalent or tetravalent; B can be trivalent; Al can be trivalent; and Ga can be trivalent. Specific examples of $M_xS_y$ include $P_2S_5$, $SiS_2$, $GeS_2$, $B_2S_3$, $Al_2S_3$ and $Ga_2S_3$. Among these, $P_2S_5$ is particularly preferable. These specific $M_xS_y$ can be used either alone as one species or in combination of two or more species. For example, when two species are used in combination, the $A_2S$-$M_xS_y$ is represented by $A_2S$-$M_{x1}S_{y1}$-$M_{x2}S_{y2}$ (x1, x2, y1 and y2 have the same meaning as x and y), and an example thereof is $A_2S$—$P_2S_5$—$GeS_2$.

(ii) Blending Ratio of $Li_2S$ or $Na_2S$ to $M_xS_y$

The mixing ratio of the above two components is not particularly limited as far as the mixture can be used as the solid electrolyte.

The values of $Li_2S$ or $Na_2S$ and $M_xS_y$ is preferably 50:50 to 90:10 (molar ratio). When the ratio of $Li_2S$ or $Na_2S$ is smaller than 50 or larger than 90, the ion conductivity may possibly decrease. The ratio can assume 50:50, 55:45, 60:40, 65:35, 70:30, 75:25, 80:20, 85:15 and 90:10. A preferable ratio is 60:40 to 80:20, and a more preferable ratio is 70:30 to 80:20.

(iii) Other Components

The solid electrolyte may contain other components that are used in the all-solid-state alkali metal secondary battery in addition to $Li_2S$ or $Na_2S$ and $M_xS_y$. Examples of those other components include an electrolyte such as LiI, $Li_3PO_4$, NaI or $Na_3PO_4$, an oxide of a metal such as P, Si, Ge, B, Al, Ga, Ti, Fe, Zn or Bi, and a binder such as polyvinylidene fluoride, polytetrafluoroethylene, polyvinyl acetate, polymethyl methacrylate or polyethylene.

(2) Nonpolar Organic Solvent and Polar Organic Solvent

The polar organic solvent has a polarity value $E_T^N$ which is higher than that of the nonpolar organic solvent by 0.3 or more. When the polarity value is less than 0.3, it is difficult to obtain the forming solution that has sufficient ion conductivity capable of being used as the solid electrolyte. A preferable polarity value is 0.45 or more, and a more preferable polarity value is 0.6 or more.

Here, the polarity values $E_T^N$ which is a parameter determined by utilizing a phenomenon that the maximum wavelength of an absorption spectrum of a pyridinium-N-phenoxide-betaine derivative changes considerably in accordance with a property of a solvent. Water and tetramethylsilane are defined as standard solvents whose values are 1.000 and 0.000, respectively, where water is the solvent having the maximum polarity value. This means that, the larger a numerical value is, the larger the polarity value of the solvent is. Also, in the present specification, for the specific polarity value $E_T^N$ of each solvent, reference is made to a numerical value described on pages 770 to 775 of the Chemical Handbook (revised fifth edition), Basic Part I (edited by the Chemical Society of Japan, issued by Maruzen Publishing Co., Ltd.).

The forming solution is preferably obtained by adding the starting materials into the nonpolar organic solvent to obtain a mixed liquid and subsequently adding the polar organic solvent into the mixed liquid. The forming solution obtained by this procedure can give sufficient ion conductivity to the solid electrolyte obtained therefrom. A reason therefor is conjectured by the present inventors to be that, by dissolving or dispersing the starting materials into the nonpolar organic solvent in advance, an opportunity of contact between the starting materials and the polar organic solvent can be increased and, as a result of this, $Li_2S$-or-$Na_2S$ and $M_xS_y$ can be allowed to react uniformly.

(i) Nonpolar Organic Solvent

The nonpolar organic solvent is not particularly limited as far as the solvent can dissolve or disperse $Li_2S$ or $Na_2S$ and $M_xS_y$. The nonpolar organic solvent is preferably a solvent having a polarity value of less than 0.5, and is more preferably a solvent having a polarity value of 0.3 or less. Also, a solvent having a substituent such as an amino group, a hydroxy group or a thiol group tends to have a high polarity value, so that the nonpolar organic solvent is preferably a solvent that does not have these substituents.

Specific examples of the nonpolar organic solvent include saturated chain hydrocarbons having a carbon number of 5 to 10 such as n-pentane (0.009), n-hexane (0.009), heptane, n-octane (0.012), nonane and decane; halogen-substituted saturated chain hydrocarbons having a carbon number of 1 to 10 such as carbon tetrachloride (0.052), chloroform (0.259) and dichloroethane (0.327); saturated ring hydrocarbons having a carbon number of 5 to 10 such as cyclohexane (0.006), cycloheptane and cyclooctane; aromatic hydrocarbons having a carbon number of 6 to 10 such as benzene (0.111), toluene (0.099) and xylene; halogen-substituted aromatic hydrocarbons having a carbon number of 6 to 10 such as chlorobenzene (0.188) and bromobenzene (0.182) (a numerical value in the parenthesis represents the polarity value). Among these, saturated hydrocarbons having a carbon number of 5 to 10 providing a good handling property are preferable, and saturated chain hydrocarbons are more preferable.

A content of the nonpolar organic solvent can be set to be 100 to 800 parts by weight relative to a sum of 100 parts by weight of $Li_2S$-or-$Na_2S$ and $M_xS_y$. When the content is less than 100 parts by weight, the nonpolar organic solvent cannot dissolve or disperse the source material sufficiently, thereby providing an insufficient contact between the source material and the polar organic solvent and making it difficult to obtain the forming solution that can give a sufficient ion conductivity capable of being used as the solid electrolyte. In addition, the viscosity of the solution may increase, making it difficult to form the layer containing the solid electrolyte by the application method. When the content is more than 800 parts by weight, it takes a longer period of time to remove the nonpolar organic solvent in forming the layer containing the solid electrolyte, thereby increasing the manufacturing costs. The content (parts by weight) can assume 100, 200, 300, 400, 500, 600, 700 and 800. A more preferable content is 300 to 500 parts by weight.

(ii) Polar Organic Solvent

The polar organic solvent is not particularly limited as far as the solvent can dissolve or disperse $Li_2S$-or-$Na_2S$ and $M_xS_y$. As the polar organic solvent, a solvent having a polarity value of 0.3 or more can be used, preferably a solvent having a polarity value of 0.5 or more, and more preferably a solvent having a polarity value of 0.6 or more. The polar organic solvent functions as a catalyst for allowing $Li_2S$-or-$Na_2S$ and $M_xS_y$ to react so as to obtain $Li_2S$-$M_xS_y$ or-$Na_2S$-$M_xS_y$; however, in order to let this function be exhibited, the polar organic solvent is preferably a solvent having a substituent such as an amino group, a hydroxy group or a thiol group. Also, the solvent having such a substituent tends to have a high polarity value.

The polar organic solvent can be selected, for example, from an aliphatic alcohol having a carbon number of 1 to 4, ethylenediamine (0.349), formamide (0.799), an alkyl-substituted formamide having a carbon number of 1 to 4, and a hydrazine-based compound. Examples of the aliphatic alcohol include methanol (0.762), ethanol (0.654), propanol (0.617: n-form) and butanol (0.602: n-form). Examples of the alkyl-substituted formamide include N-methylformamide (0.722).

Among these organic solvents, N-methylformamide and ethylenediamine are particularly preferable in view of solubility.

The content of the polar organic solvent can be set to be 100 to 800 parts by weight relative to a sum of 100 parts by weight of $Li_2S$-or-$Na_2S$ and $M_xS_y$. When the content is less than 100 parts by weight, it may not be possible to allow $Li_2S$-or-$Na_2S$ and $M_xS_y$ to react sufficiently. In addition, the viscosity of the solution may increase, making it difficult to form the layer containing the solid electrolyte by the application method. When the content is more than 800 parts by weight, it takes a longer period of time to remove the polar organic solvent in forming the layer containing the solid electrolyte, thereby increasing the manufacturing costs. The content (parts by weight) can assume 100, 200, 300, 400, 500, 600, 700 and 800. A more preferable content is 300 to 500 parts by weight.

(3) Method for Manufacturing Forming Solution

The forming solution is not particularly limited as far as the layer containing the solid electrolyte layer can be obtained. The manufacturing method may be, for example, a method of adding the source material into the nonpolar organic solvent to obtain a mixed liquid and subsequently adding the polar organic solvent into the mixed liquid. By using the solvents in this order, it is possible to obtain a forming solution in which $Li_2S$-or-$Na_2S$-$M_xS_y$ is dispersed more uniformly. In addition, there is no need to synthesize and calcine starting materials to obtain $Li_2S$-or-$Na_2S$-$M_xS$ once by synthesis and firing, but $Li_2S$ or $Na_2S$-$M_xS_y$ can be obtained directly from the source material, whereby the manufacturing costs can be reduced.

The forming solution can be manufactured at room temperature (about 25° C.) in an inert atmosphere. Also, when the polar organic solvent is added, heat may be generated by reaction of $Li_2S$-or-$Na_2S$ and $M_xS_y$, so that a temperature is preferably kept constant by cooling with ice.

(All-Solid-State Alkali Metal Secondary Battery)

The all-solid-state alkali metal secondary battery includes the positive electrode, the negative electrode and the solid electrolyte layer positioned between the positive electrode and the negative electrode.

When the positive electrode and/or the negative electrode are constituted of an active material, the active material may be made of coated active material particles. Here, the coated active material particles mean particles having active material particles (active material in a particulate form) and a layer containing a solid electrolyte that coats a surface along an outer shape thereof. The solid electrolyte contains $A_2S$ and $M_xS_y$ (A is selected from Li and Na; M is selected from P, Si, Ge, B, Al and Ga; and x and y are a number that gives a stoichiometric ratio in accordance with the species of M).

The positive electrode and/or the negative electrode may include an assembly of a plurality of active material particles and a layer containing a solid electrolyte that coats a surface along an outer shape of individual active material particles and fills a gap between the active material particles. The solid electrolyte contains $A_2S$ and $M_xS_y$ (A is selected from Li and Na; M is selected from P, Si, Ge, B, Al and Ga; and x and y are a number that gives a stoichiometric ratio in accordance with the species of M). The layer containing the solid electrolyte that fills the gap between the active material particles preferably has a thickness of 10 to 1000 nm. It is difficult to realize this thickness by a conventional method of simply mixing and pressing an active material in a solid form and the solid electrolyte. The layer containing the solid electrolyte having this thickness can be obtained, for example, by pressing the coated active material particles.

In the present invention, any one of the solid electrolyte layer, the positive electrode, and the negative electrode can be formed by applying of the forming solution and drying.

(1) Negative Electrode

The negative electrode is not particularly limited, so that any of negative electrodes that are generally used in the all-solid-state alkali metal secondary battery can be used.

In the case of forming the negative electrode by using the forming solution, the negative electrode active material may be either dissolved in the forming solution or dispersed in a particulate form in the forming solution. Examples of the negative electrode active material include metals such as Li, In and Sn, alloys thereof, graphite and various transition metal oxides such as SnO.

Further, the forming solution may contain a binder, an electroconductive agent and the like in accordance with the needs.

Examples of the binder include polyvinylidene fluoride, polytetrafluoroethylene, polyvinyl acetate, polymethyl methacrylate and polyethylene.

Examples of the electroconductive agent include natural graphite, artificial graphite, acetylene black and vapor-grown carbon fibers (VGCF).

In the case in which the forming solution is not used, the negative electrode may be made of a Li metal layer or a Li alloy layer in a foil form (for example, Li—In alloy, Li—Sn alloy, Li—Si alloy, Li—Al alloy or the like).

Also, besides the above Li metal layer or Li alloy layer, the negative electrode obtained by pressing the grains of the negative electrode active material may be used. This negative electrode obtained by pressing may contain the binder, the electroconductive agent, the solid electrolyte and the like in accordance with the needs. As this solid electrolyte, the solid electrolyte obtained by drying the forming solution may be used.

The negative electrode may include a current collector made of SUS (stainless steel), aluminum, copper or the like.

(2) Positive Electrode

The positive electrode is not particularly limited, so that any of positive electrodes that are generally used in the all-solid-state alkali metal secondary battery can be used.

In the case of forming the positive electrode by using the forming solution, the positive electrode active material may be either dissolved in the forming solution or dispersed in a particulate form in the forming solution. For example, in the case of a battery of a type in which electrode reaction occurs via lithium, examples of the positive electrode active material include $Li_4Ti_5O_{12}$, $LiCoO_2$, $LiMnO_2$, $LiVO_2$, $LiCrO_2$, $LiNiO_2$, $Li_2NiMn_3O_8$, $LiNi_{1/3}Co_{1/3}Mn_{1/3}O_2$, S and $Li_2S$. Also, in the case of a battery of a type in which electrode reaction occurs via sodium, examples of the positive electrode active material include $Na_4Ti_5O_{12}$, $NaCoO_2$, $NaMnO_2$, $NaVO_2$, $NaCrO_2$, $NaNiO_2$, $Na_2NiMn_3O_8$, $NaNiMn_{1/3}Co_{1/3}Mn_{1/3}O_2$, S and $Na_2S$. Among these, the positive electrode active material in a particulate form may be coated with a material such as $LiNbO_3$, $NaNbO_3$, $Al_2O_3$ or NiS.

Further, the forming solution may contain the binder, the electroconductive agent and the like in accordance with the needs.

Examples of the binder include polyvinylidene fluoride, polytetrafluoroethylene, polyvinyl acetate, polymethyl methacrylate and polyethylene.

Examples of the electroconductive agent include natural graphite, artificial graphite, acetylene black and vapor-grown carbon fibers (VGCF).

In the case in which the forming solution is not used, the positive electrode can be obtained in a pellet form, for example, by mixing the positive electrode active material and the optional binder, electroconductive agent, solid electrolyte and the like and pressing the obtained mixture. As this solid electrolyte, a solid electrolyte obtained by drying the forming solution may be used.

Also, in the case in which a metal sheet (foil) made of a metal or an alloy thereof is used as the positive electrode active material, the positive electrode active material can be used as it is.

The positive electrode may be formed on a current collector made of SUS, aluminum, copper or the like.

(3) Solid Electrolyte Layer

The forming solution can be used for forming the solid electrolyte layer.

The solid electrolyte layer may be obtained by pressing the solid electrolyte.

Besides the solid electrolyte obtained from the forming solution, the solid electrolyte in a glass ceramic form can be used for the solid electrolyte layer. The solid electrolyte in a glass ceramic form can be obtained by subjecting a mixture of starting materials of the solid electrolyte to mechanical milling to obtain a solid electrolyte in a glass form and subsequently subjecting the resultant to a heat treatment. This heat treatment can be carried out at a temperature higher than or equal to a glass transition point of the solid electrolyte in a glass form. The glass transition point is typically within a range from 180 to 240° C., and an upper limit of a heat treatment temperature is not particularly limited; however, the upper limit is typically the glass transition point+100° C.

A heat treatment time is a time during which the solid electrolyte can be transformed from the glass form to the glass ceramic form. Therefore, the higher the heat treatment temperature is, the shorter the heat treatment time is. Conversely, the lower the heat treatment temperature is, the longer the heat treatment time is. The heat treatment time is typically within a range from 0.1 to 10 hours.

(4) Conditions for Forming the Layer Containing the Solid Electrolyte

The layer containing the solid electrolyte can be obtained by applying the forming solution and drying an obtained coating film. The application method is not particularly limited and may be, for example, brush application, a dropping method, a spin-coating method, a spraying method or the like. Conditions of drying are not particularly limited as far as the organic solvents can be removed. Typically, the drying can be carried out at a temperature higher than or equal to a higher boiling point of which either the nonpolar organic solvent or the polar organic solvent. Also, a drying temperature can be lowered when the drying is carried out under a reduced pressure.

(5) Method for Manufacturing all-Solid-State Secondary Battery

The all-solid-state secondary battery can be manufactured, for example, by:
(i) a method of molding the positive electrode, the solid electrolyte layer, and the negative electrode into pellets, respectively, and stacking the resultant,
(ii) a method of transferring the positive electrode, the solid electrolyte layer, and the negative electrode, which have been formed on a base by the application method, respectively, from the base for stacking,
(iii) a method of stacking the positive electrode, the solid electrolyte layer, and the negative electrode sequentially by the application method, or the like method.

EXAMPLES

The present invention is hereinafter further specifically illustrated by way of Examples and Comparative Examples which do not limit the present invention.

Example 1

With use of a mortar, $Li_2S$ (manufactured by Idemitsu Kosan Co., Ltd., having a purity of 99.9%) and $P_2S_5$ (manufactured by Sigma-Aldrich Japan K.K., having a purity of 99%) were mixed at a molar ratio of 80:20. Into 0.3 g of the obtained mixture, 1.5 ml of n-hexane was put. After putting, the resultant was stirred at room temperature to obtain an n-hexane solution of a mixture of $Li_2S$ and $P_2S_5$. While cooling this solution with ice, 1.5 ml of N-methylformamide (NMF) was put. After putting, the resultant was stirred for one hour, and subsequently stirred at room temperature for 5 hours to obtain a forming solution for forming a layer containing a solid electrolyte. The obtained forming solution was a yellow liquid.

From the forming solution, n-hexane, which was a supernatant liquid, was removed. After removal, the NMF solution was separated into two, whereupon one was dried at 150° C. in vacuum for 3 hours, and the other was dried at 180° C. in vacuum for 3 hours, thereby to deposit a yellow solid electrolyte.

A Raman spectrum of the NMF solution after removal of n-hexane is shown in FIG. 1. FIG. 1 shows together a Raman spectrum of NMF and a Raman spectrum of an NMF solution containing 15% by weight of $P_2S_5$.

Figure 2:
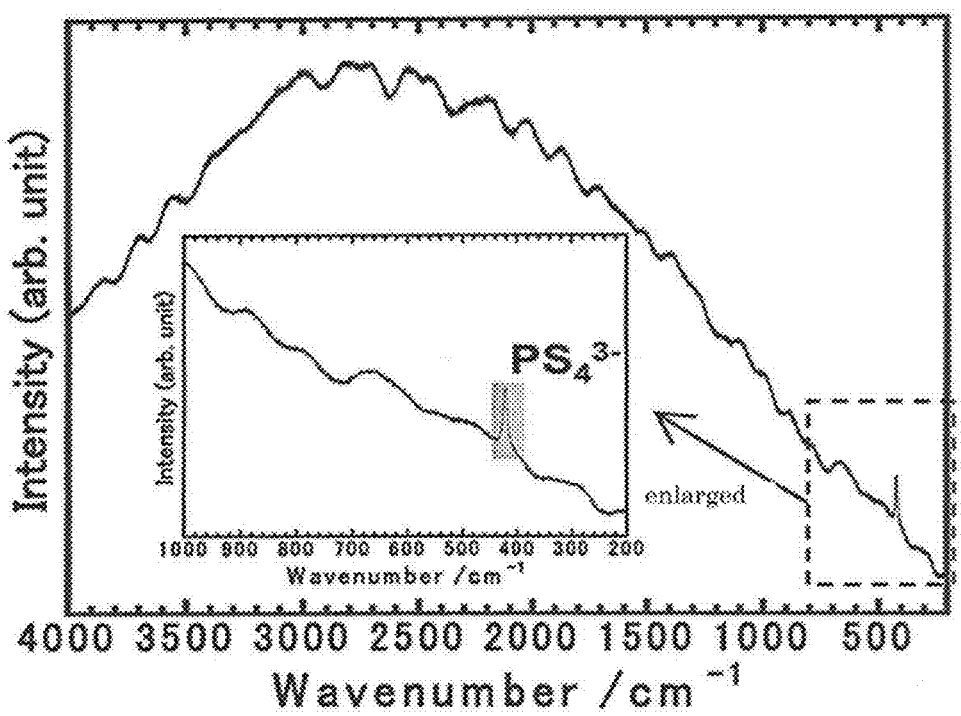
FIG. 2 is a Raman spectrum of a solid electrolyte of Example 1.

FIG. 2 shows a Raman spectrum of the solid electrolyte dried at 180° C.

Figure 3:
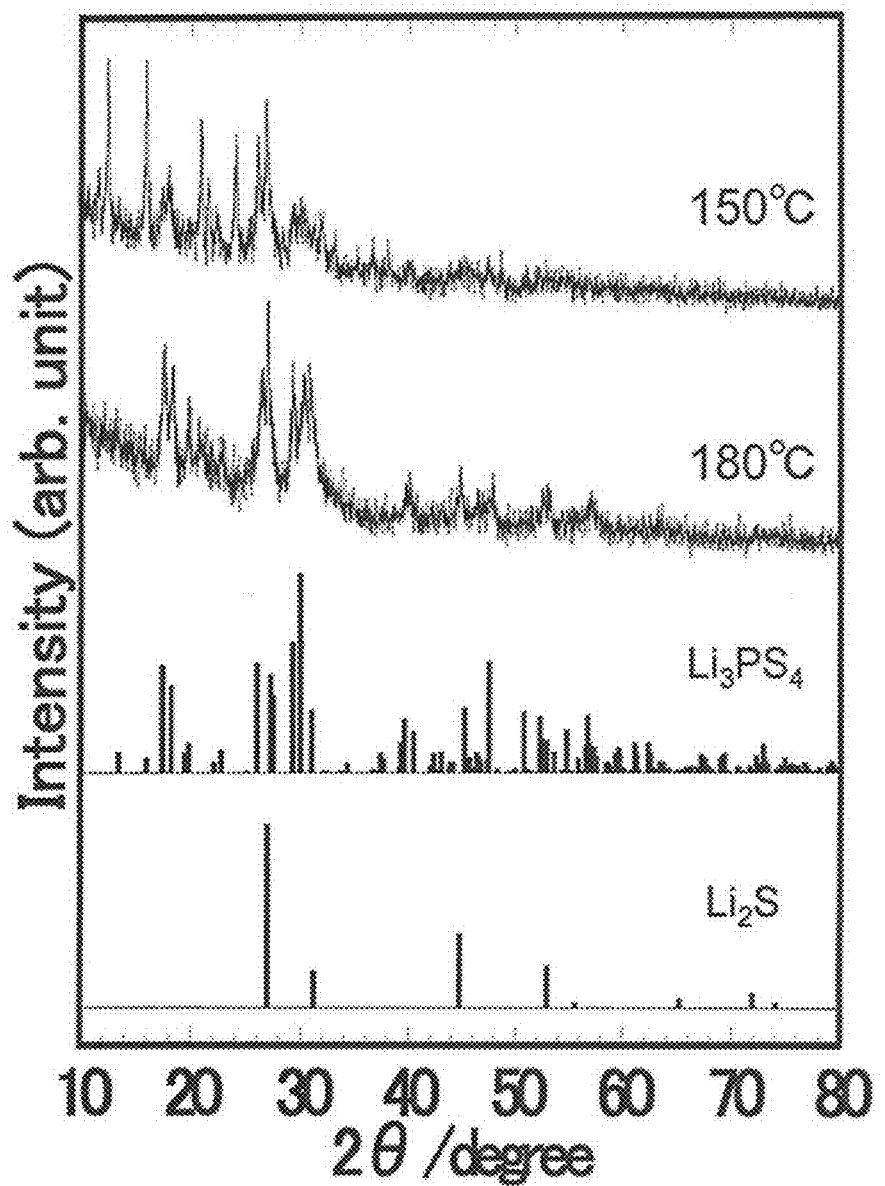
FIG. 3 is X-ray diffraction patterns of the solid electrolyte of Example 1.

FIG. 3 shows X-ray diffraction patterns of the solid electrolyte dried at 150° C. and the solid electrolyte dried at 180° C. FIG. 3 also shows X-ray diffraction patterns of $Li_3PS_4$ ($75Li_2S$-$25P_2S_5$) and $Li_2S$ together.

FIG. 1 shows that the NMF solution after removal of n-hexane has a peak deriving from $PS_4^{3-}$, and hence it will be understood that, by putting of NMF, $Li_2S$ and $P_2S_5$ react to produce $Li_3PS_4$. This can be confirmed also by presence of a peak deriving from $PS_4^{3-}$ in the Raman spectrum of the dried solid electrolyte in FIG. 2. Further, it will be understood from FIG. 3 that the obtained solid electrolyte contains a lot of $Li_3PS_4$, though a peak of $Li_2S$ is recognized.

Next, ion conductivity of the solid electrolyte was measured, indicating $2.4 \times 10^{-6}$ $Scm^{-1}$ (25° C.).

Comparative Example 1

In order to attain a molar ratio of 80:20, 0.14 g of $Li_2S$ and 0.16 g of $P_2S_5$ were weighed. Into 1.5 ml of NMF, $Li_2S$ was put, and the resultant was stirred at room temperature for 30 minutes to obtain a white turbid suspension having a high viscosity. While cooling the obtained suspension with ice, $P_2S_5$ was put, and the resultant was stirred for 6 hours to obtain a brown solution. During this stirring, heat and white smoke were generated. The solution was separated into two, whereupon one was dried at 150° C. in vacuum for 3 hours, and the other was dried at 180° C. in vacuum for 3 hours, thereby to deposit a solid electrolyte.

Figure 4:
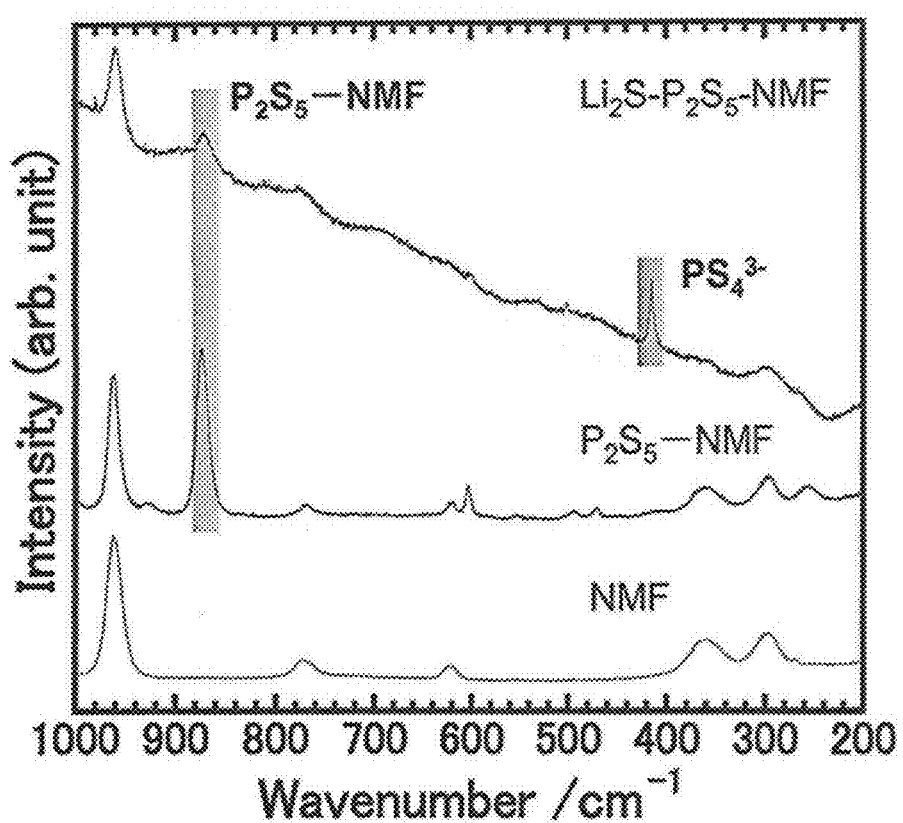
FIG. 4 is Raman spectra of an NMF solution of Comparative Example 1.

A Raman spectrum of the NMF solution is shown in FIG. 4. FIG. 4 shows together a Raman spectrum of NMF and a Raman spectrum of an NMF solution containing 15 wt % of $P_2S_5$.

Figure 5:
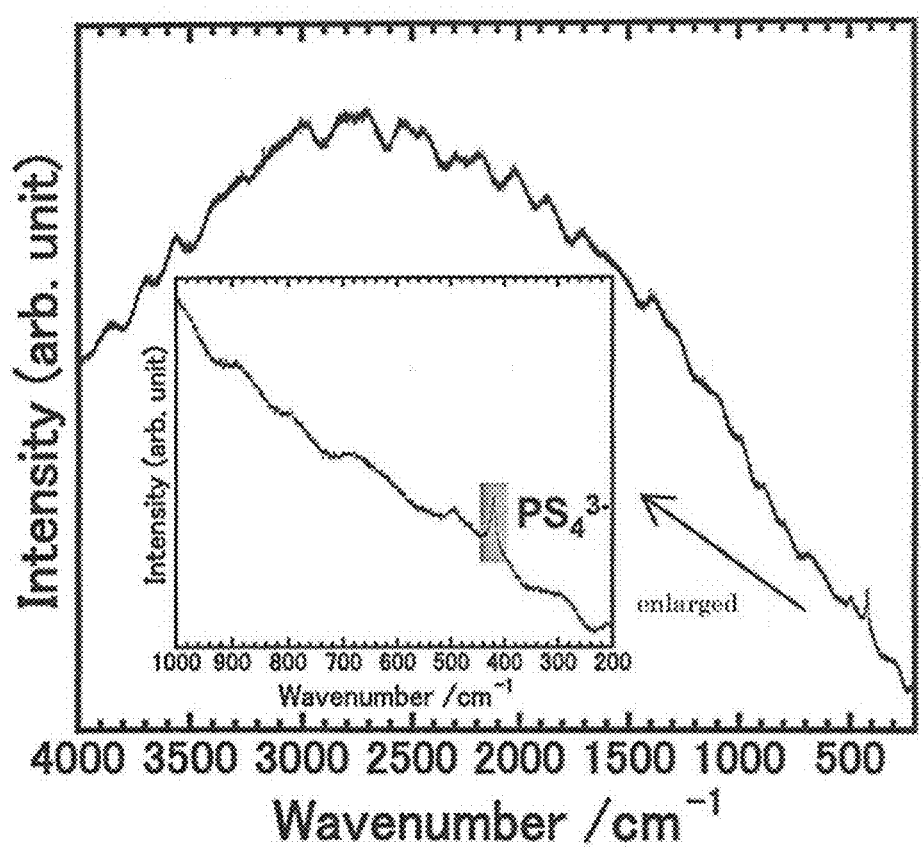
FIG. 5 is a Raman spectrum of a solid electrolyte of Comparative Example 1.

FIG. 5 shows a Raman spectrum of the solid electrolyte dried at 180° C.

Figure 6:
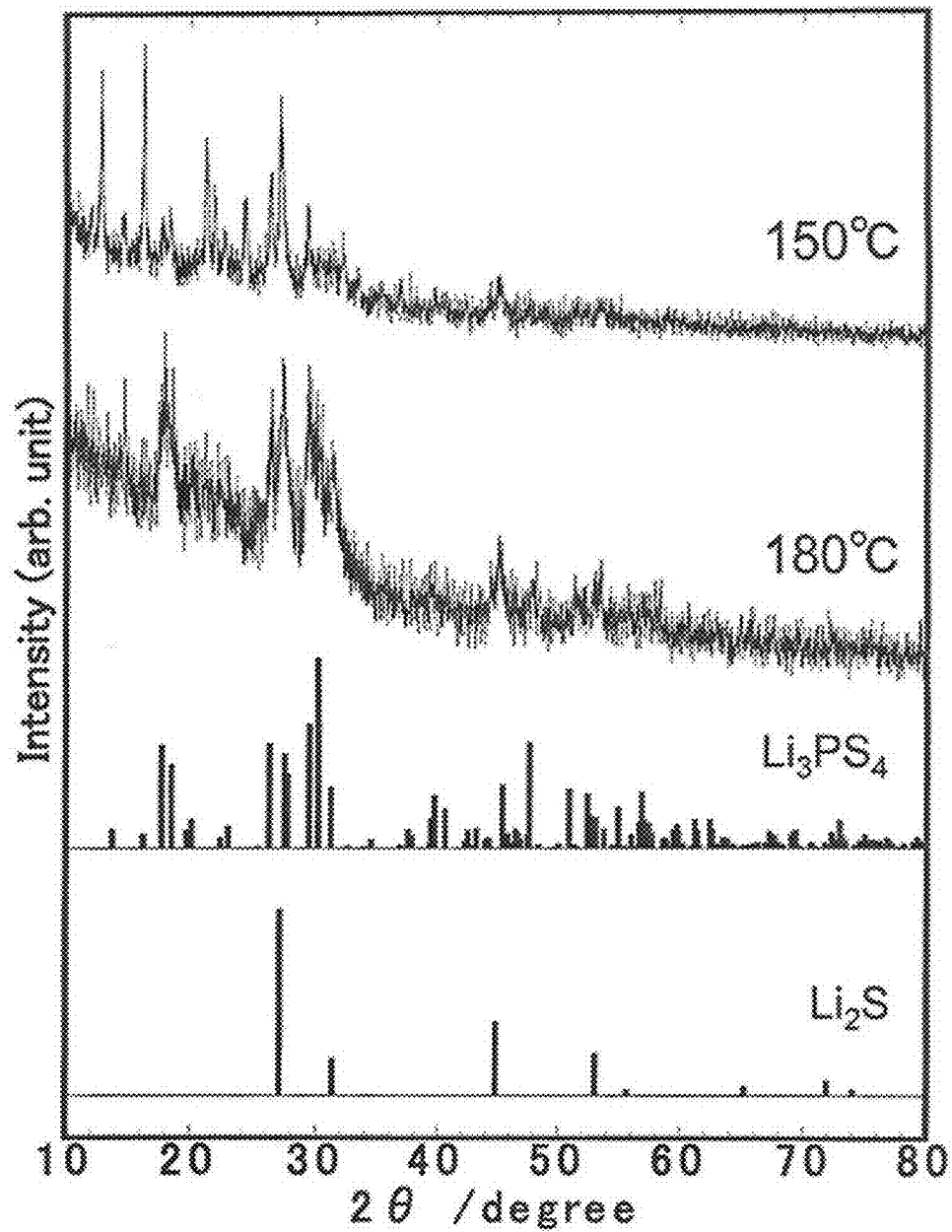
FIG. 6 is X-ray diffraction patterns of the solid electrolyte of Comparative Example 1.

FIG. 6 shows X-ray diffraction patterns of the solid electrolyte dried at 150° C. and the solid electrolyte dried at 180° C. FIG. 6 also shows X-ray diffraction patterns of $Li_3PS_4$ ($75Li_2S$-$25P_2S_5$) and $Li_2S$ together in the same manner as in FIG. 3.

From FIGS. 4 to 6, a tendency similar to that of FIGS. 1 to 3 can be read out (though in FIG. 4, remaining of $P_2S_5$ was confirmed). However, when ion conductivity of the solid electrolyte was measured, the ion conductivity indicated $1.9 \times 10^{-6}$ $Scm^{-1}$ (25° C.), which was lower than that of Example 1. This seems to be due to the following reason. That is, because the viscosity of the suspension increased, mixing of the suspension and $P_2S_5$ was not uniform, so that the reaction between $Li_2S$ and $P_2S_5$ did not proceed uniformly.

Comparative Example 2

An attempt was made to obtain a solution in the same manner as in Comparative Example 1 except that $Li_2S$ and $P_2S_5$ were mixed in a mortar, and NMF was put into an obtained mixture. However, this experiment was stopped because heat and white smoke were generated a lot.

Example 2

With use of a mortar, $Li_2S$ (manufactured by Idemitsu Kosan Co., Ltd., having a purity of 99.9%) and $P_2S_5$ (manufactured by Sigma-Aldrich Japan K.K., having a purity of 99%) were mixed at a molar ratio of 70:30. Into 0.3 g of the obtained mixture, 1.5 ml of n-hexane was put. After putting, the resultant was stirred at room temperature to obtain an n-hexane solution of a mixture of $Li_2S$ and $P_2S_5$. While cooling this solution with ice, 1.5 ml of ethylenediamine (EDA) was put. After putting, the resultant was stirred for 30 minutes and subsequently stirred at room temperature for 5 hours to obtain a forming solution for forming a layer containing a solid electrolyte. The obtained forming solution was a yellow liquid.

From the forming solution, n-hexane, which was a supernatant liquid, was removed. After removal, the EDA solution was separated into two, whereupon one was dried at 200° C. in vacuum for 3 hours, and the other was dried at 270° C. in vacuum for 3 hours, thereby to deposit a yellow solid electrolyte.

Figure 7:
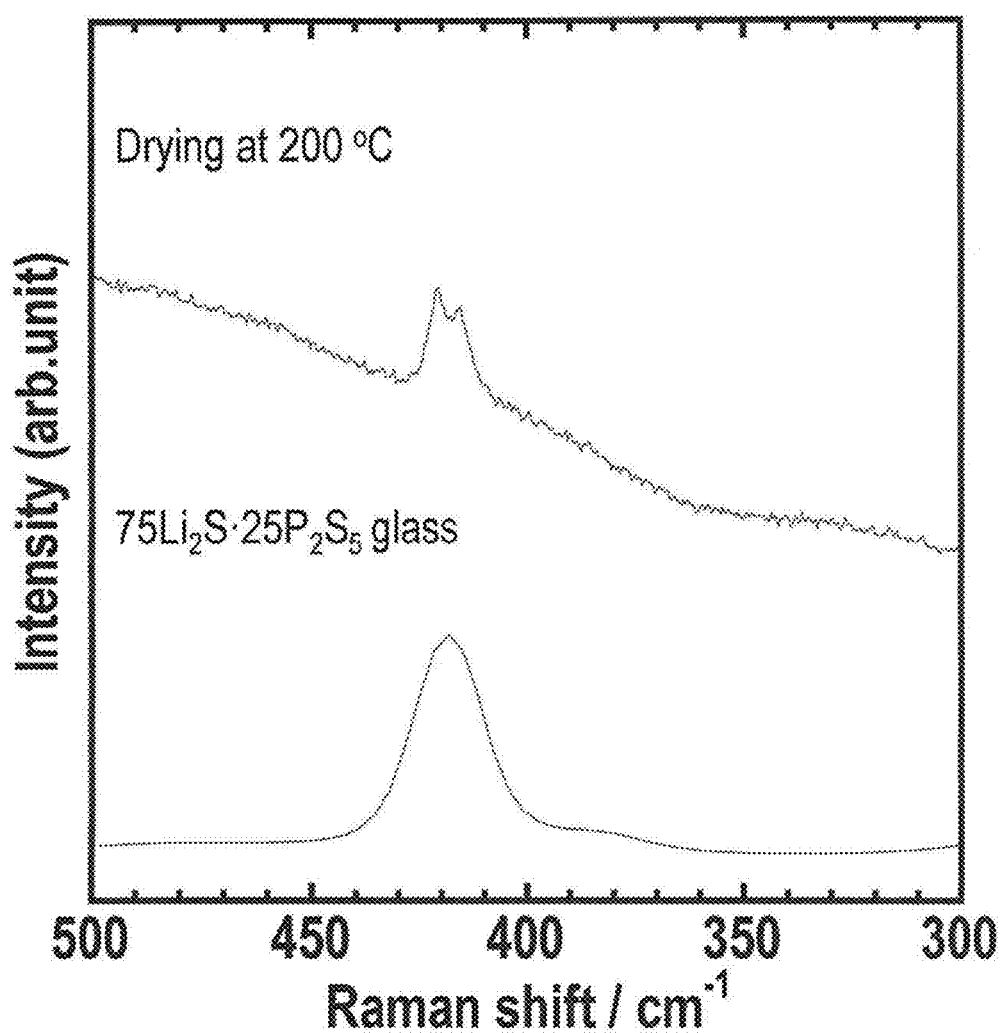
FIG. 7 is Raman spectra of a solid electrolyte of Example 2.

A Raman spectrum of the solid electrolyte dried at 200° C. is shown in FIG. 7. FIG. 7 shows together a Raman spectrum of $Li_3PS_4$ ($75Li_2S$-$25P_2S_5$).

Figure 8:
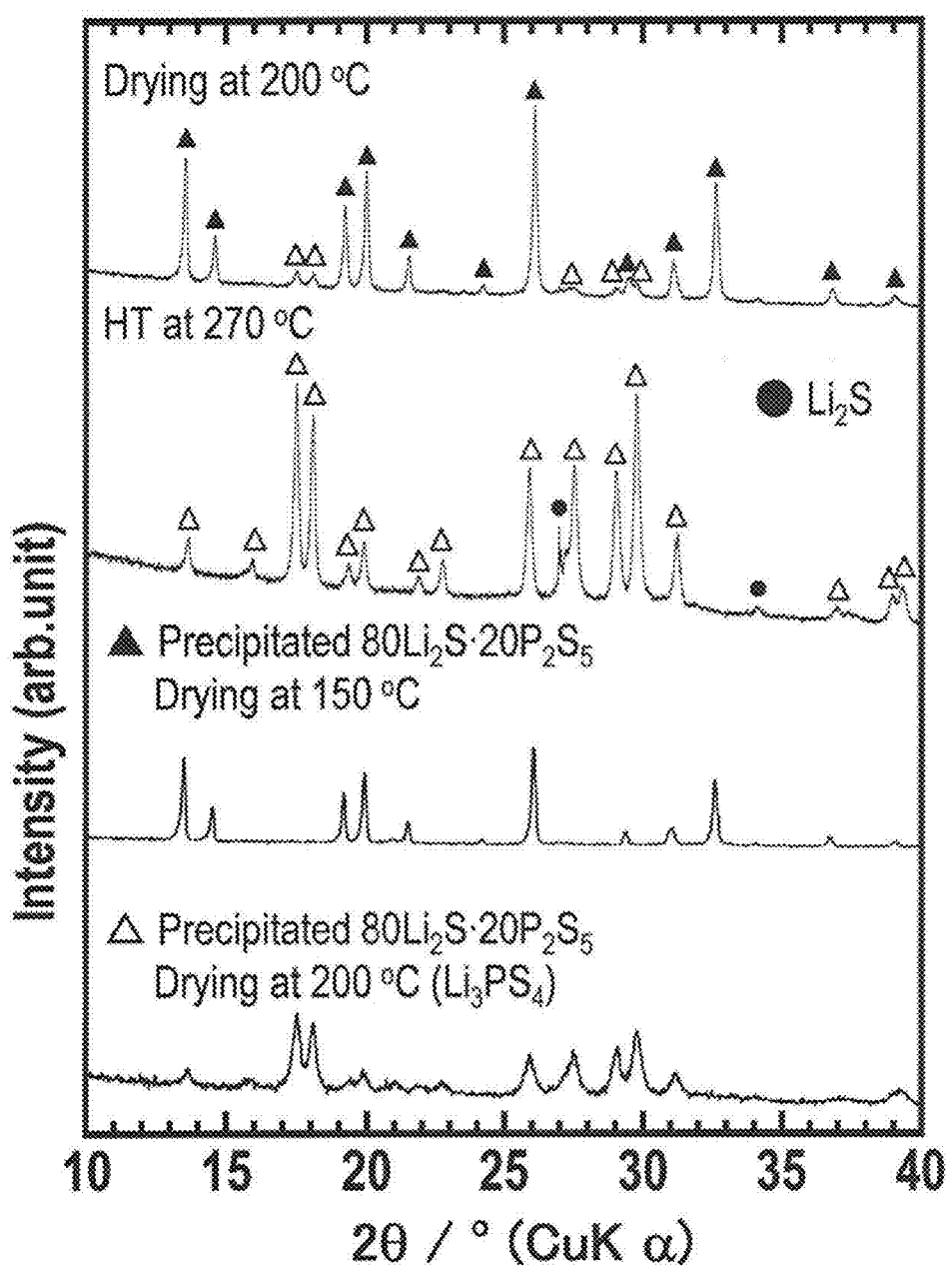
FIG. 8 is X-ray diffraction patterns of the solid electrolyte of Example 2.

FIG. 8 shows X-ray diffraction patterns of the solid electrolyte dried at 200° C. and the solid electrolyte dried at 270° C. FIG. 8 also shows an X-ray diffraction pattern (▲) of a substance obtained by drying the EDA solution at 150° C. in vacuum for 3 hours and an X-ray diffraction pattern (Δ) of $Li_3PS_4$ together. The X-ray diffraction pattern ▲ corresponds to an X-ray diffraction pattern of a precursor being in a state before being turned into a solid electrolyte.

From FIG. 7, it will be understood that the solid electrolyte dried at 200° C. has a peak deriving from $Li_3PS_4$. Further, from FIG. 8, it will be understood that the solid electrolyte dried at 200° C. has the precursor and $Li_3PS_4$ that are mixedly present. Also, it will be understood that the solid electrolyte dried at 270° C., though peaks of $Li_3PS_4$ and $Li_2S$ are recognized, contains a lot of $Li_3PS_4$.

Next, ion conductivity of the solid electrolyte dried at 270° C. was measured, indicating $8.9 \times 10^{-6}$ $Scm^{-1}$ (25° C.).

Example 3

With use of a mortar, $Na_2S$ (manufactured by Nagao & Co., Ltd., having a purity of 99.1%) and $P_2S_5$ (manufactured by Sigma-Aldrich Japan K.K., having a purity of 99%) were mixed at a molar ratio of 75:25. Into 0.3 g of the obtained mixture, 1.5 ml of n-hexane was put. After putting, the resultant was stirred at room temperature to obtain an n-hexane solution of a mixture of $Na_2S$ and $P_2S_5$. While cooling this solution with ice, 1.5 ml of NMF was put. After putting, the resultant was stirred for two hours, and subsequently stirred at room temperature for 4 hours to obtain a forming solution for forming a layer containing a solid electrolyte. The obtained forming solution was a yellow liquid.

From the forming solution, n-hexane, which was a supernatant liquid, was removed. After removal, the NMF solution was dried at 260° C. in vacuum for 3 hours, thereby to deposit a yellow solid electrolyte.

Figure 9:
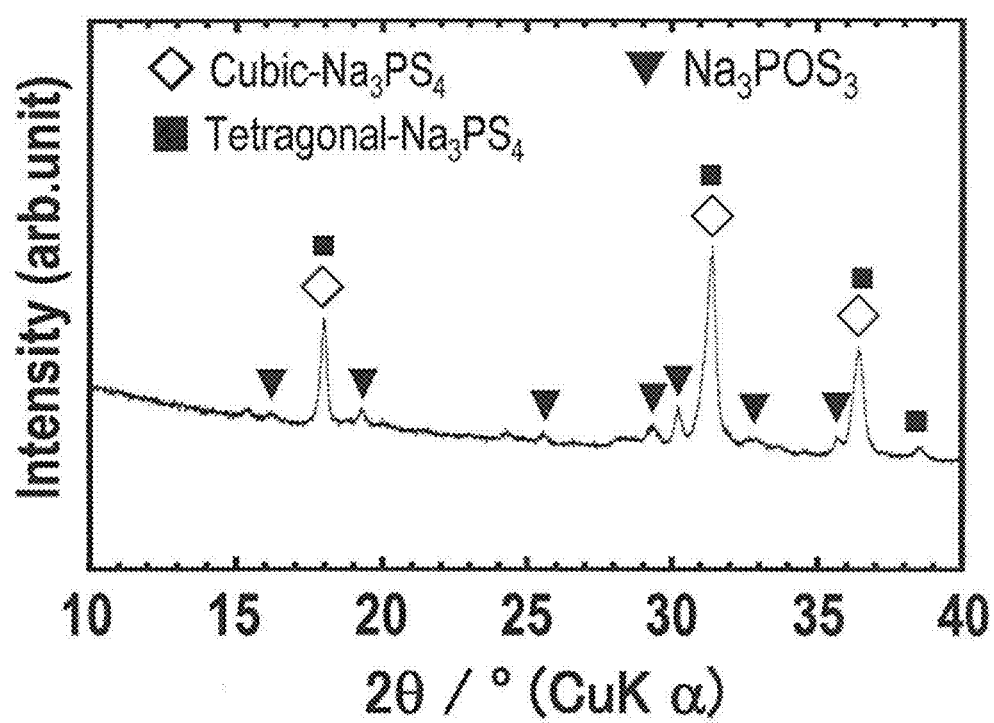
FIG. 9 is an X-ray diffraction pattern of a solid electrolyte of Example 3.

FIG. 9 shows an X-ray diffraction pattern of the dried solid electrolyte. From FIG. 9, it will be understood that the dried solid electrolyte contains a lot of cubic (Cubic) $Na_3PS_4$ (↑). Also, it will be understood that tetragonal (Tetragonal) $Na_3PS_4$ (■) and $Na_3POS_3$ (▼) are present in a little amount.

Next, ion conductivity of the solid electrolyte was measured, indicating $1.6 \times 10^{-6}$ $Scm^{-1}$ (25° C.).

Example 4

With use of a mortar, $Na_2S$ (manufactured by Nagao & Co., Ltd., having a purity of 99.1%) and $P_2S_5$ (manufactured by Sigma-Aldrich Japan K.K., having a purity of 99%) were mixed at a molar ratio of 75:25. Into 0.3 g of the obtained mixture, 1.5 ml of n-hexane was put. After putting, the resultant was stirred at room temperature to obtain an n-hexane solution of a mixture of $Na_2S$ and $P_2S_5$. While cooling this solution with ice, 1.5 ml of EDA was put. After putting, the resultant was stirred for 30 minutes and subsequently stirred at room temperature for 5 hours to obtain a forming solution for forming a layer containing a solid electrolyte. The obtained forming solution was a yellow liquid.

From the forming solution, n-hexane, which was a supernatant liquid, was removed. After removal, the EDA solution was separated into two, whereupon one was dried at 180° C. in vacuum for 3 hours, and the other was dried at 270° C. in vacuum for 3 hours, thereby to deposit a yellow solid electrolyte.

Figure 10:
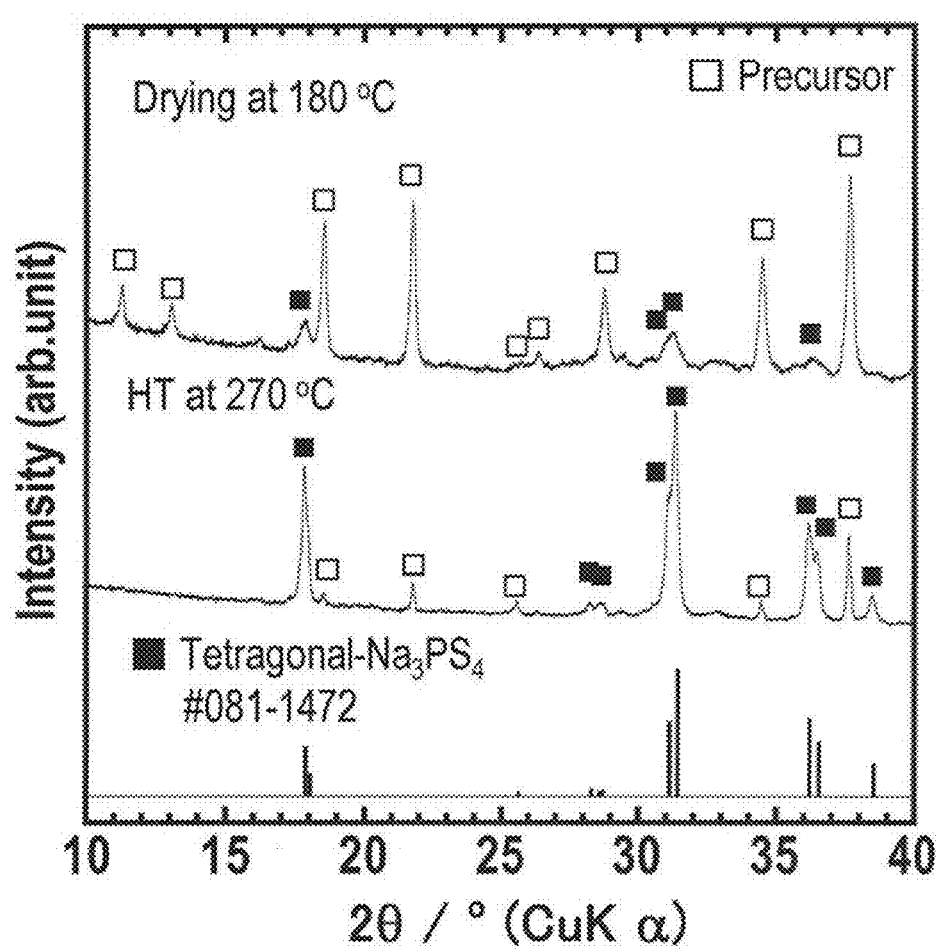
FIG. 10 is X-ray diffraction patterns of a solid electrolyte of Example 4.

FIG. 10 shows X-ray diffraction patterns of the solid electrolyte dried at 180° C. and the solid electrolyte dried at 270° C. FIG. 10 also shows an X-ray diffraction pattern of tetragonal $Na_3PS_4$ (■) together. The X-ray diffraction pattern □corresponds to an X-ray diffraction pattern of a precursor being in a state before being turned into a solid electrolyte.

From FIG. 10, it will be understood that the solid electrolyte dried at 270° C. contains a smaller amount of the precursor than the solid electrolyte dried at 180° C., and a lot of tetragonal $Na_3PS_4$ is present.

Next, ion conductivity of the solid electrolyte was measured, indicating $3.1 \times 10^{-6}$ $Scm^{-1}$ (25° C.).

Example 5

Figure 11:
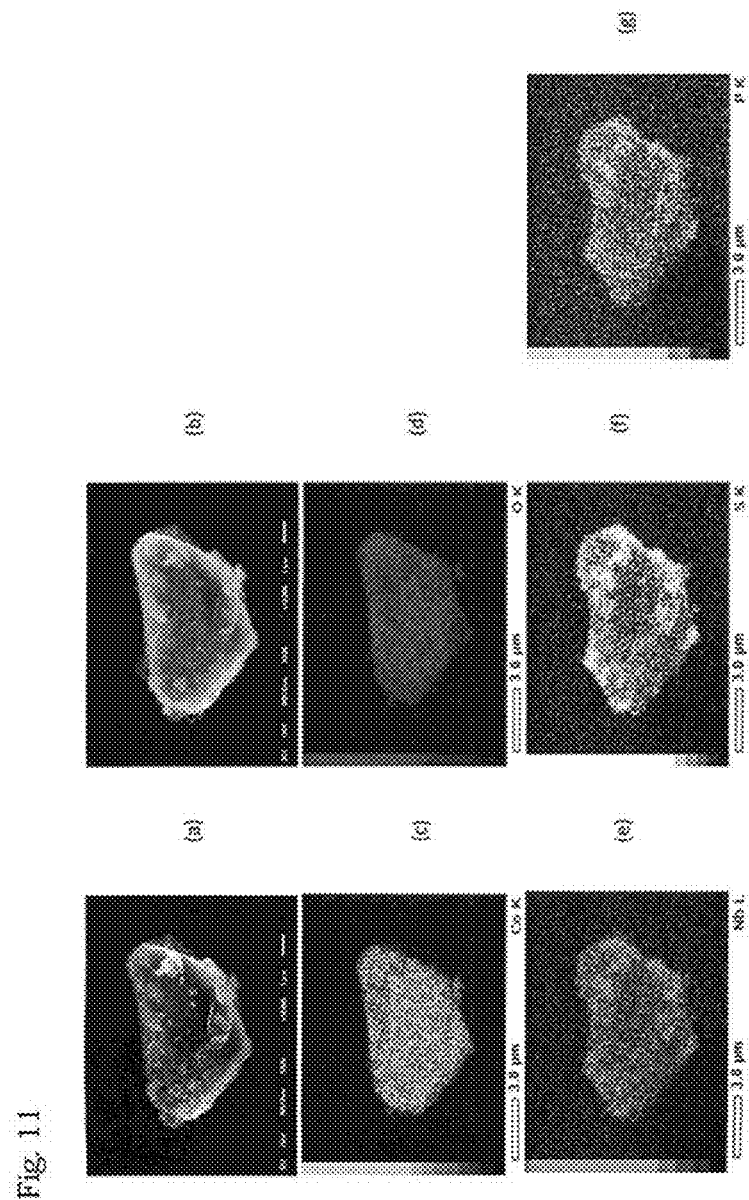
FIG. 11 is SEM photographs and EXD mapping images of a treated particle of Example 5.

A forming solution for forming a layer containing a solid electrolyte was obtained in the same manner as in Example 1. To the obtained solution, $LiCoO_2$ particles (manufactured by TODA KOGYO CORP., having an average particle size of about 10 μm) coated with $LiNbO_3$ were mixed so that a weight ratio of a solid component of the solution and the particles would be 7.5:92.5. The obtained mixed liquid was dried at 180° C. in vacuum for 3 hours to remove the NMF, so as to take out the treated particles. FIGS. 11(a) to 11(g) show SEM photographs of the obtained particles and EDX mapping images with respect to Co, O, Nb, S and P. Here, FIG. 11(a) is a photograph of the particle before being treated with the solution; FIG. 11(b) is a photograph of the treated particle; FIG. 11(c) is an image showing presence of Co; FIG. 11(d) is an image showing presence of O; FIG. 11(e) is an image showing presence of Nb; FIG. 11(f) is an image showing presence of S; and FIG. 11(g) is an image showing presence of P. FIGS. 11(c) and 11(d) correspond to Co and O of $LiCoO_2$; FIG. 11(e) corresponds to Nb of $LiNbO_3$; and FIGS. 11(f) and 11(g) correspond to S and P of $Li_2S$—$P_2S_5$.

From FIGS. 11(a) to 11(g), it will be understood that the surface of the $LiCoO_2$ particles are almost entirely coated with the layer made of $Li_2S$—$P_2S_5$.

Here, the LiCoO$_2$ particles coated with LiNbO$_3$ were obtained by spraying to apply a solution containing a precursor of LiNbO$_3$ onto LiCoO$_2$ and subsequently subjecting to a heat treatment at 350° C.

Example 6

Figure 12:
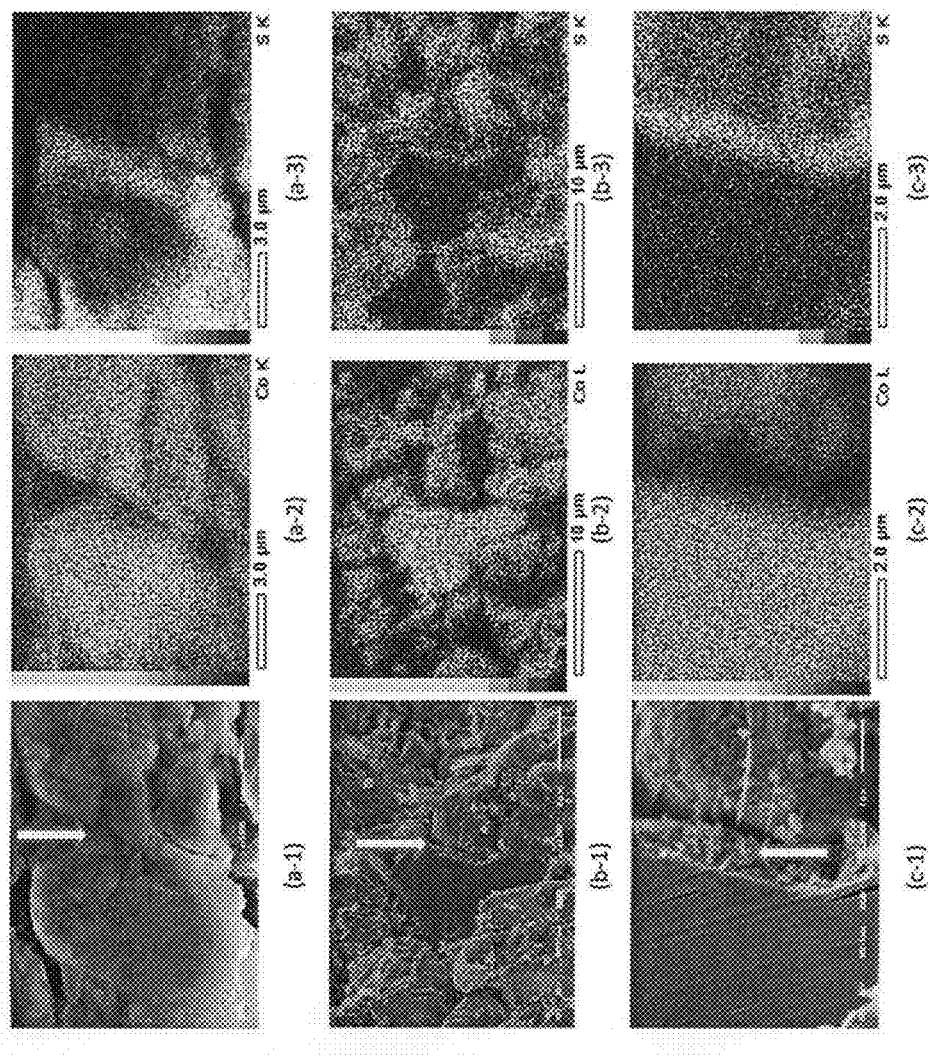
FIG. 12 is SEM photographs and EXD mapping images of a fractured surface of a positive electrode of Example 6.

With use of a pellet molding machine, 10 mg of the particles coated with Li$_2$S—P$_2$S$_5$ obtained in Example 5 were pressed under a pressure of 370 MPa to obtain a positive electrode in a pellet form (having a thickness of about 1 mm). The obtained positive electrode was fractured. FIGS. 12(a-1) to 12(c-3) show SEM photographs of a fractured surface and EDX mapping images with respect to Co and S. Here, FIG. 12(c-1) is an enlarged photograph of FIG. 12(b-1). FIGS. 12(a-2), 12(b-2) and 12(c-2) are images showing presence of Co of FIGS. 12(a-1), 12(b-1) and 12(c-1), and FIGS. 12(a-3), 12(b-3) and 12(c-3) are images showing presence of S of FIGS. 12(a-1), 12(b-1) and 12(c-1).

When FIGS. 12(a-1) to 12(a-3), FIGS. 12(b-1) to 12(b-3) and FIGS. 12(c-1) to 12(c-3) are seen, it will be understood that the particle surface is almost entirely coated with the layer made of Li$_2$S—P$_2$S$_5$. In particular, an arrow part of FIG. 12(a-1) shows that the layer made of Li$_2$S—P$_2$S$_5$ is present between the particles, and the arrow part of FIGS. 12(b-1) and 12(c-1) observes a cross section of the layer made of Li$_2$S—P$_2$S$_5$ between the particles.

From FIGS. 12(a-1), 12(b-1) and 12(c-1), it will be understood that the layer made of Li$_2$S—P$_2$S$_5$ is present between the particles. In particular, from FIG. 12(c-1), it will be understood that the layer made of Li$_2$S—P$_2$S$_5$ has a thickness of about 500 nm.

What is claimed is:

1. A forming solution for forming a layer containing a solid electrolyte for an all-solid-state alkali metal secondary battery comprising a component derived from A$_2$S and M$_x$S$_y$ (A is selected from Li and Na; M is selected from P, Si, Ge, B, Al and Ga; and x and y are a number that gives a stoichiometric ratio in accordance with a species of M) as a starting material for manufacturing the solid electrolyte, a nonpolar organic solvent and a polar organic solvent having a polarity value higher than that of the nonpolar organic solvent by 0.3 or more,
   wherein the nonpolar organic solvent has a polarity value of less than 0.5, and the polar organic solvent has a polarity value of 0.5 or more,
   wherein the nonpolar organic solvent is selected from hydrocarbons having a carbon number of 5 to 10, and the polar organic solvent is selected from aliphatic alcohols having a carbon number of 1 to 4, formamide, formamide substituted with an alkyl group having a carbon number of 1 to 4, and hydrazine-based compounds, and
   wherein a content of the nonpolar organic solvent and the polar organic solvent is set to be 100 to 800 parts by weight respectively relative to a sum of 100 parts by weight of A$_2$S and M$_x$S$_y$.

2. The forming solution for forming a layer containing a solid electrolyte for an all-solid-state alkali metal secondary battery of claim 1, comprising a component derived from Li$_2$S and M$_x$S$_y$ (M is selected from P, Si, Ge, B, Al and Ga; and x and y are a number that gives a stoichiometric ratio in accordance with a species of M) as a starting material for manufacturing the solid electrolyte, the nonpolar organic solvent and the polar organic solvent having a polarity value higher than that of the nonpolar organic solvent by 0.3 or more.

3. The forming solution for forming a layer containing a solid electrolyte for an all-solid-state alkali metal secondary battery of claim 1, comprising a component derived from Na$_2$S and M$_x$S$_y$ (M is selected from P, Si, Ge, B, Al and Ga; and x and y are a number that gives a stoichiometric ratio in accordance with a species of M) as a starting material for manufacturing the solid electrolyte, the nonpolar organic solvent and the polar organic solvent having a polarity value higher than that of the nonpolar organic solvent by 0.3 or more.

4. The forming solution for forming a layer containing a solid electrolyte for an all-solid-state alkali metal secondary battery of claim 1, wherein the forming solution is a solution obtained by adding a starting material into the nonpolar organic solvent to obtain a mixed liquid and subsequently adding the polar organic solvent into the mixed liquid.

5. The forming solution for forming a layer containing a solid electrolyte for an all-solid-state alkali metal secondary battery of claim 1, wherein the nonpolar organic solvent is n-hexane, and the polar organic solvent is N-methylformamide or ethylenediamine.

6. The forming solution for forming a layer containing a solid electrolyte for an all-solid-state alkali metal secondary battery of claim 1, wherein the solid electrolyte is Li$_2$S-M$_x$S$_y$ containing Li$_2$S and M$_x$S$_y$ at a ratio of 50:50 to 90:10 (molar ratio), and M$_x$S$_y$ is P$_2$S$_5$.

7. The forming solution for forming a layer containing a solid electrolyte for an all-solid-state alkali metal secondary battery of claim 1, wherein the solid electrolyte is Na$_2$S-M$_x$S$_y$ containing Na$_2$S and M$_x$S$_y$ at a ratio of 50:50 to 90:10 (molar ratio), and M$_x$S$_y$ is P$_2$S$_5$.

8. The forming solution for forming a layer containing a solid electrolyte for an all-solid-state alkali metal secondary battery of claim 1, wherein the layer containing a solid electrolyte is a solid electrolyte layer, a positive electrode, and/or a negative electrode.

9. An all-solid-state alkali metal secondary battery comprising a positive electrode, a negative electrode and a solid electrolyte layer positioned between the positive electrode and the negative electrode, wherein one of the solid electrolyte layer, the positive electrode and the negative electrode is formed by applying of the forming solution of claim 1 and drying.

10. A method for manufacturing an all-solid-state alkali metal secondary battery comprising a positive electrode, a negative electrode and a solid electrolyte layer positioned between the positive electrode and the negative electrode, wherein one of the solid electrolyte layer, the positive electrode and the negative electrode is formed by applying of the forming solution of claim 1 and drying.

11. A coated active material particle for a positive electrode and/or a negative electrode of an all-solid-state alkali metal secondary battery, wherein the coated active material particle includes an active material particle and a layer containing a solid electrolyte that coats a surface along an outer shape thereof, wherein the solid electrolyte contains A$_2$S and P$_2$S$_5$ (A is selected from Li and Na), and wherein the solid electrolyte has a peak deriving from PS$_4^{3-}$ in a Raman spectra of a N-methylformamide (NMF) solution.

12. The coated active material particle of claim 11, wherein the layer containing the solid electrolyte is layer formed by applying the forming solution for forming a layer containing a solid electrolyte for an all-solid-state alkali metal secondary battery of claim 1 to the surface of the active material particle and drying.

13. An electrode for an all-solid-state alkali metal secondary battery comprising an assembly of a plurality of active material particles and a layer containing a solid electrolyte that coats a surface along an outer shape of individual active material particles and fills a gap between the active material particles, wherein the solid electrolyte contains $A_2S$ and $P_2S_5$ (A is selected from Li and Na), the electrode is a positive electrode and/or a negative electrode, and the solid electrolyte has a peak deriving from $PS_4^{3-}$ in a Raman spectra of a N-methylformamide (NMF) solution.

14. The electrode of claim 13, wherein the layer containing the solid electrolyte that fills the gap between the active materials has a thickness of 10 to 1000 nm.

15. The electrode of claim 13, wherein the electrode is obtained by pressing the coated active material particles.

16. The forming solution for forming a layer containing a solid electrolyte for an all-solid-state alkali metal secondary battery of claim 1, wherein a content of the nonpolar organic solvent is 100 to 800 parts by weight relative to a sum of 100 parts by weight of $Li_2S$-or-$Na_2S$ and $M_xS_y$.

17. The forming solution for forming a layer containing a solid electrolyte for an all-solid-state alkali metal secondary battery of claim 1, wherein a content of the polar organic solvent is 100 to 800 parts by weight relative to a sum of 100 parts by weight of $Li_2S$-or-$Na_2S$ and $M_xS_y$.

18. The forming solution for forming a layer containing a solid electrolyte for an all-solid-state alkali metal secondary battery of claim 4, wherein the forming solution is manufactured at room temperature.

19. A solid electrolyte for an all-solid-state alkali metal secondary battery, obtained by drying the forming solution for forming a layer containing a solid electrolyte for an all-solid-state alkali metal secondary battery of claim 6, wherein the solid electrolyte has a X-ray diffraction pattern indicating a presence of more $Li_3PS_4$ than $Li_2S$.

20. A solid electrolyte for an all-solid-state alkali metal secondary battery, obtained by drying the forming solution for forming a layer containing a solid electrolyte for an all-solid-state alkali metal secondary battery of claim 7, wherein the solid electrolyte has a X-ray diffraction pattern indicating a presence of an amount of cubic $Na_3PS_4$ or tetragonal $Na_3PS_4$.

21. The solid electrolyte for an all-solid-state alkali metal secondary battery of claim 20, wherein the solid electrolyte has a X-ray diffraction pattern indicating a presence of more tetragonal $Na_3PS_4$ than $Na_2S$ and $P_2S_5$ as precursors.

22. The forming solution for forming a layer containing a solid electrolyte for an all-solid-state alkali metal secondary battery of claim 1, wherein the nonpolar organic solvent is selected from n-pentane, n-hexane, heptane, n-octane, nonane, decane, carbon tetrachloride, chloroform, dichloroethane, cyclohexane, cycloheptane, cyclooctane, benzene, toluene, xylene, chlorobenzene, and bromobenzene, and the polar organic solvent is selected from ethylenediamine, formamide, methanol, ethanol, propanol, butanol, and N-methylformamide.

* * * * *